__(12)__ United States Patent
Choi et al.

(10) Patent No.: US 10,904,660 B2
(45) Date of Patent: Jan. 26, 2021

(54) ELECTRONIC DEVICE AND METHOD FOR DETERMINING AUDIO PROCESSING ALGORITHM BASED ON LOCATION OF AUDIO INFORMATION PROCESSING DEVICE

(71) Applicant: Samsung Electronics Co., Ltd., Suwon-si (KR)

(72) Inventors: Younhyung Choi, Suwon-si (KR); Yunguk Lee, Suwon-si (KR); Jungjae Lee, Suwon-si (KR); Seungnyun Kim, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/734,470

(22) Filed: Jan. 6, 2020

(65) Prior Publication Data

US 2020/0221224 A1 Jul. 9, 2020

(30) Foreign Application Priority Data

Jan. 7, 2019 (KR) .......................... 10-2019-0001971

(51) Int. Cl.
*H04R 3/00* (2006.01)
*H04R 1/40* (2006.01)
(Continued)

(52) U.S. Cl.
CPC .............. *H04R 3/005* (2013.01); *G06F 8/65* (2013.01); *G10L 21/0272* (2013.01); *G10L 25/84* (2013.01); *H04R 1/406* (2013.01)

(58) Field of Classification Search
CPC ........... H04R 3/005; H04R 1/406; G06F 8/65; G10L 21/0272; G10L 25/84
See application file for complete search history.

(56) References Cited

U.S. PATENT DOCUMENTS

| 2008/0312918 A1 | 12/2008 | Kim |
| 2011/0051953 A1* | 3/2011 | Makinen ................ H04R 3/005 |
| | | 381/92 |

(Continued)

FOREIGN PATENT DOCUMENTS

| JP | 2011-118124 A | 6/2011 |
| JP | 2013-511750 A | 4/2013 |

(Continued)

OTHER PUBLICATIONS

International Search Report and Written Opinion of the International Searching Authority in connection with International Application No. PCT/KR2019/018019 dated Mar. 31, 2020, 8 pages.

*Primary Examiner* — Simon King

(57) ABSTRACT

An electronic device includes a plurality of microphones, a memory configured to store a plurality of instructions, and a processor operatively connected to the plurality of microphones and the memory. The plurality of instructions cause the electronic device to recognize connection of the plurality of microphones to the electronic device and obtain connection information for the plurality of microphones. The plurality of instructions further cause the electronic device to generate a signal for outputting an audio signal, obtain multiple pieces of audio information corresponding to the output audio signal, through the plurality of microphones, identify location information for the plurality of microphones, determine an audio information processing algorithm corresponding to the connection information and the location information, and execute a firmware update for the processor such that the multiple pieces of audio information obtained through the plurality of microphones is processed by using the determined audio information processing algorithm.

20 Claims, 8 Drawing Sheets

(51) Int. Cl.
*G06F 8/65* (2018.01)
*G10L 25/84* (2013.01)
*G10L 21/0272* (2013.01)

(56) References Cited

U.S. PATENT DOCUMENTS

| | | |
|---|---|---|
| 2012/0197638 A1 | 8/2012 | Li et al. |
| 2015/0244337 A1 | 8/2015 | Ko et al. |
| 2016/0112811 A1* | 4/2016 | Jensen ................ G10L 21/0232 381/17 |
| 2018/0091898 A1 | 3/2018 | Yoon et al. |
| 2018/0184225 A1* | 6/2018 | Zhang .................... H04S 7/303 |
| 2019/0191214 A1* | 6/2019 | Mandavilli ........ G06K 9/00288 |
| 2019/0324710 A1* | 10/2019 | Klimanis ................ G06F 3/165 |

FOREIGN PATENT DOCUMENTS

| | | |
|---|---|---|
| JP | 2015-082701 A | 4/2015 |
| KR | 10-2008-0111290 A | 12/2008 |
| KR | 10-2015-0098809 A | 8/2015 |
| KR | 10-2016-0144919 A | 12/2016 |

\* cited by examiner

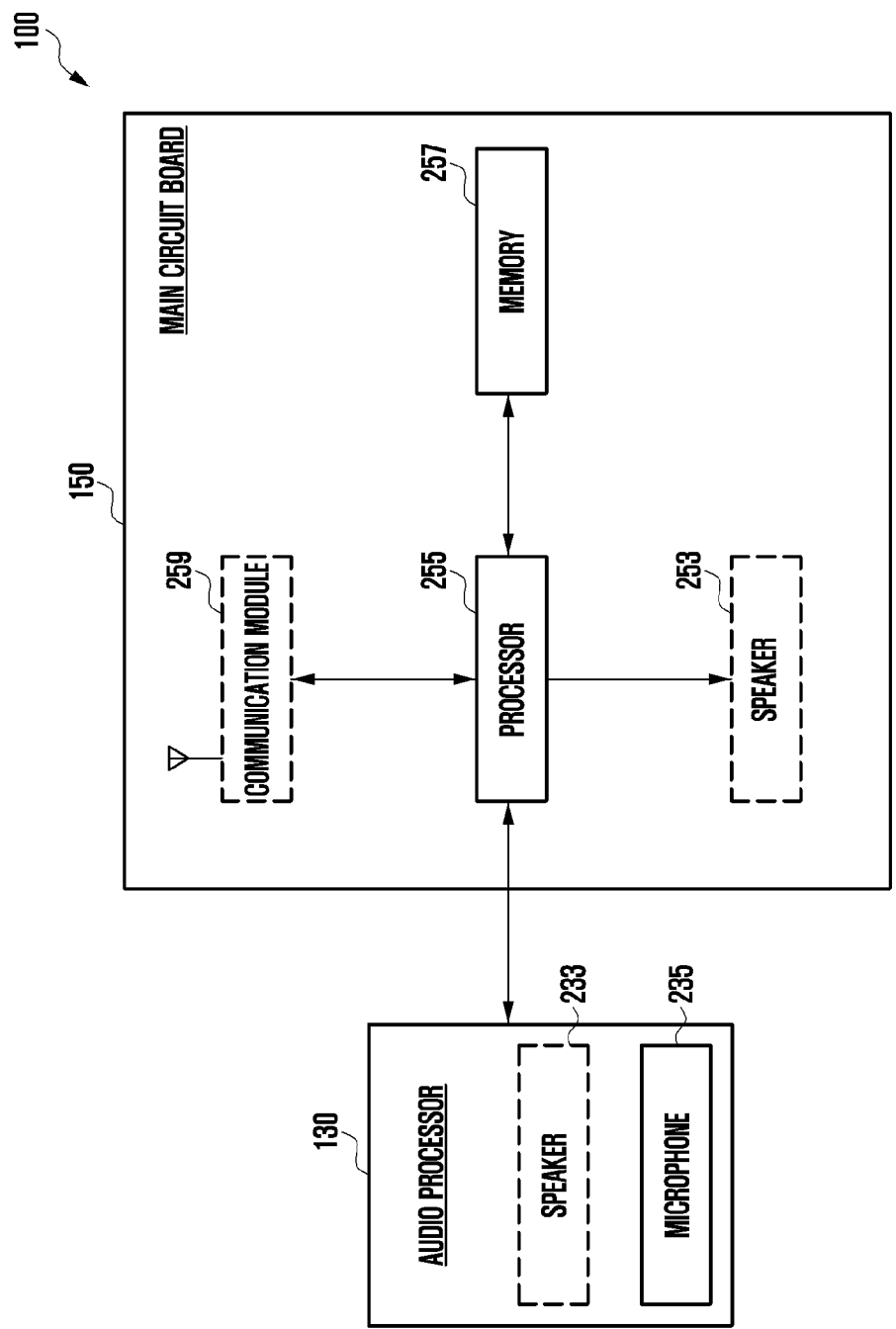

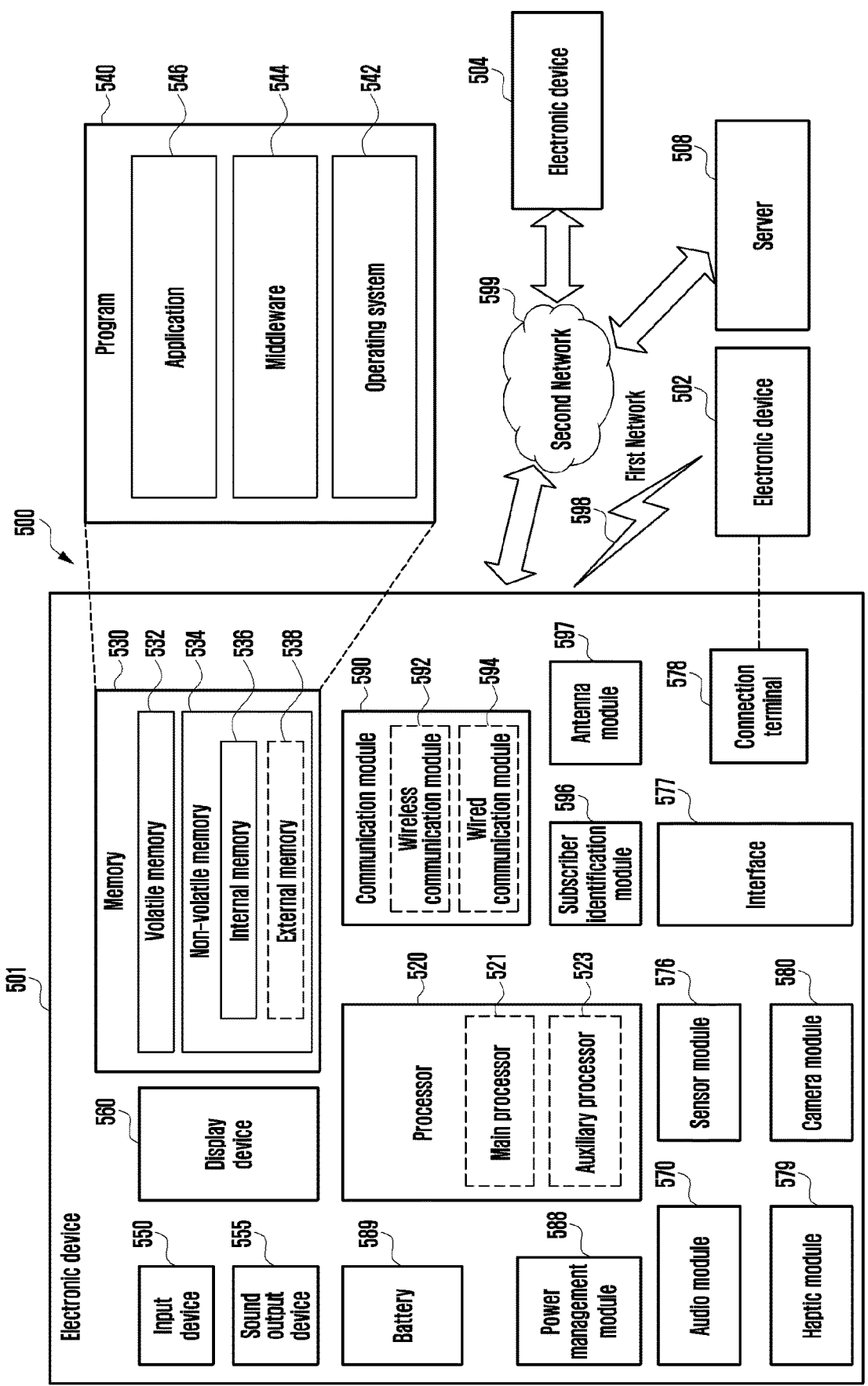

ELECTRONIC DEVICE AND METHOD FOR DETERMINING AUDIO PROCESSING ALGORITHM BASED ON LOCATION OF AUDIO INFORMATION PROCESSING DEVICE

CROSS-REFERENCE TO RELATED APPLICATION

This application is based on and claims priority under 35 U.S.C. 119 to Korean Patent Application No. 10-2019-0001971, filed on Jan. 7, 2019, in the Korean Intellectual Property Office, the disclosure of which is herein incorporated by reference in its entirety.

BACKGROUND

1. Field

Various embodiments of the disclosure relate to an electronic device and a method for determining an algorithm for audio information processing.

2. Description of Related Art

According to the development of the Internet of Things and the like, technologies capable of controlling various types of electronic devices through a user's voice are required. For example, when a user speaks using his/her voice to control a specific device, the spoken voice may be received through a microphone and used to control a target device.

Meanwhile, some of the devices configuring an electronic system may be operated as hardware independently of an application program or an operating system (OS) through firmware. Such a firmware may be updated to new versions even after a product is released for stable performance and bug fixes.

The above information is presented as background information only to assist with an understanding of the disclosure. No determination has been made, and no assertion is made, as to whether any of the above might be applicable as prior art with regard to the disclosure.

SUMMARY

An electronic device may employ a preprocessing technique capable of receiving a user's voice by using a plurality of microphones, so as to more accurately recognize the user's voice even in a noisy environment. For example, the electronic device may improve voice recognition performance of the electronic device through an algorithm for analyzing multiple pieces of audio information obtained using the plurality of microphones to reinforce a user's voice which is a target sound source, and remove noise which is a different sound source.

The algorithm for processing audio information is required to be configured differently according to information of the plurality of microphones of the electronic device. Therefore, whenever an electronic device is released in a new design according to various product types or uses, it may be cumbersome for a user or a designer to configure an appropriate algorithm for processing audio information in consideration of the number of the microphones arranged in the electronic device, an arrangement interval of the microphones, a direction of audio information received by the microphones, and the like.

An electronic device according to various embodiments may include: a plurality of microphones; a memory configured to store a plurality of instructions; and a processor operatively connected to the plurality of microphones and the memory, wherein the plurality of instructions, when executed by the processor, cause the electronic device to: recognize connection of the plurality of microphones to the electronic device and obtain connection information for the plurality of microphones; generate a signal for outputting an audio signal; obtain multiple pieces of audio information corresponding to the output audio signal, through the plurality of microphones; identify location information for the microphones, at least based on the multiple pieces of audio information; determine an audio information processing algorithm corresponding to the connection information and the location information, based on one or more pieces of audio information processing algorithm information stored in the memory; and execute a firmware update for the processor such that the multiple pieces of audio information obtained through the microphones is processed by using the determined audio information processing algorithm.

An audio information processing method of an electronic device according to various embodiments may include: recognizing, by a processor, connection of a plurality of microphones to the electronic device, and obtaining connection information for the microphones; generating, by the processor, a signal for outputting an audio signal; obtaining multiple pieces of audio information corresponding to the output audio signal, through the plurality of microphones; identifying, by the processor, location information for the microphones, at least based on the multiple pieces of audio information; determining, by the processor, an audio information processing algorithm corresponding to the connection information and the location information, based on one or more pieces of audio information processing algorithm information stored in a memory of the electronic device; and executing, by the processor, a firmware update for the processor so as to allow the multiple pieces of audio information obtained through the microphones to be processed by using the determined audio information processing algorithm.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 2 illustrates a block diagram of an electronic device according to various embodiments of the disclosure;

FIG. 5 illustrates a block diagram of an electronic device 501 within a network environment 500, according to various embodiments.

DETAILED DESCRIPTION

FIGS. 1A through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings.

Figure 1A:
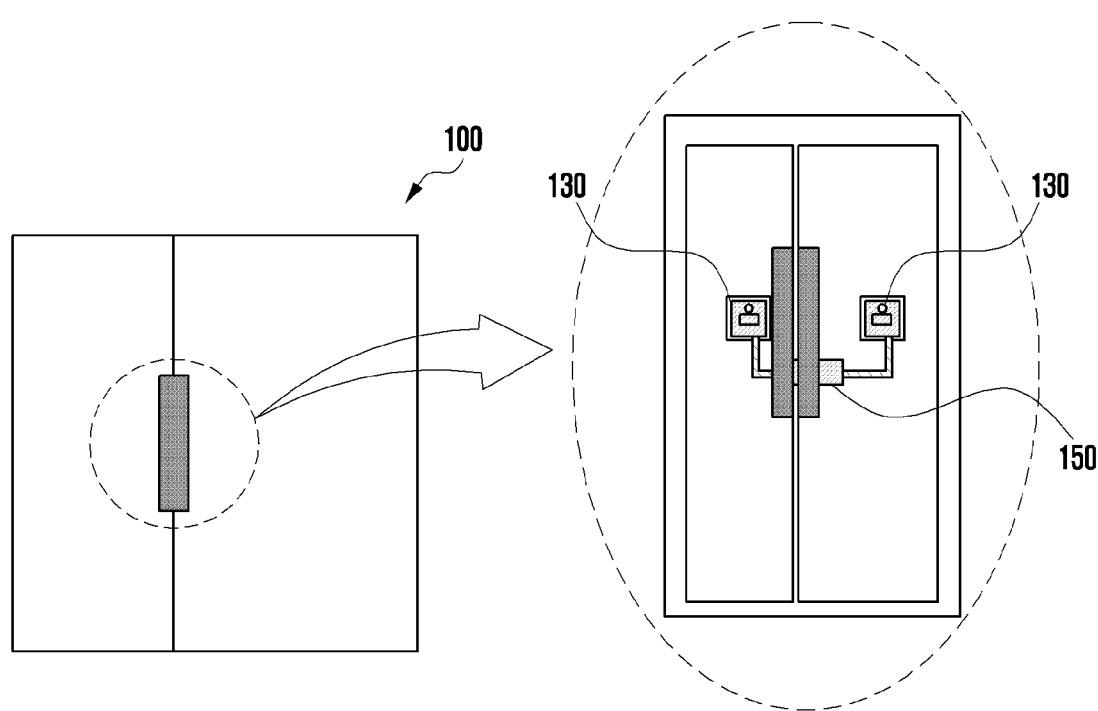
FIG. 1A illustrates an electronic device according to various embodiments.
Figure 1B:
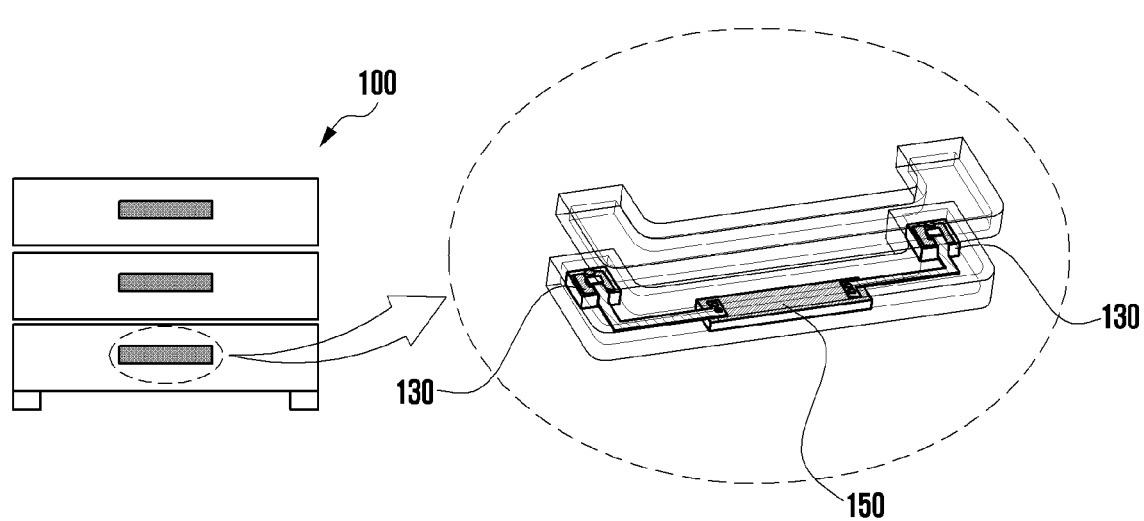
FIG. 1B illustrates an electronic device according to various embodiments.
Figure 1C:
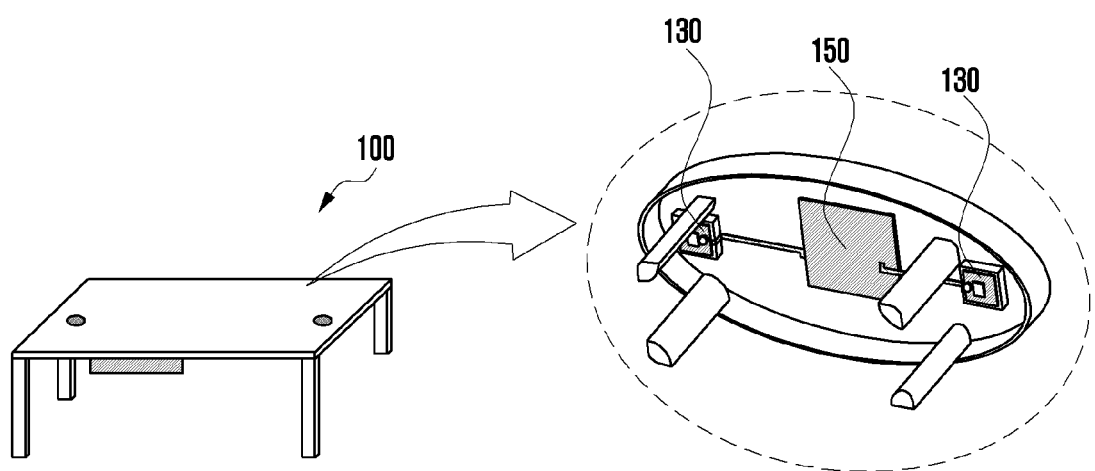
FIG. 1C illustrates an electronic device according to various embodiments.
Figure 1D:
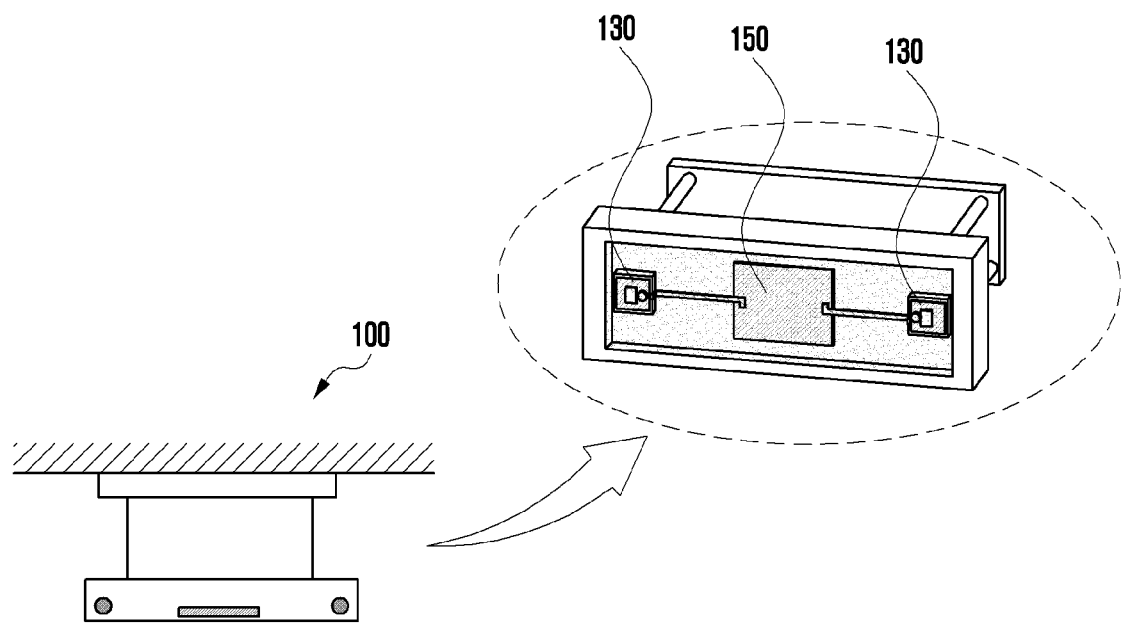
FIG. 1D illustrates an electronic device according to various embodiments.

FIG. 1A illustrates an electronic device 100 according to various embodiments, FIG. 1B illustrates an electronic device 100 according to various embodiments, FIG. 1C illustrates an electronic device 100 according to various embodiments, and FIG. 1D illustrates an electronic device 100 according to various embodiments.

An electronic device 100 (e.g., an electronic device 501 of FIG. 5) according to various embodiments may include a main circuit board 150 including at least one configuration of a processor (e.g., a processor 520 of FIG. 5), a memory (e.g., a memory 530 of FIG. 5), or a communication module (e.g., a communication module 590 of FIG. 5), and at least one audio processor 130 electrically connected to the main circuit board 150.

For example, the audio processor 130 may convert sound into an electrical signal or convert an electrical signal into sound. According to an embodiment, the audio processor 130 may obtain sound through an input device (e.g., a microphone) (e.g., an input device 550 of FIG. 5), or may output sound through a sound output device (e.g., a speaker) (e.g., a sound output device 555 of FIG. 5).

Referring to FIGS. 1A to 1D, the electronic device 100 according to various embodiments may include various types of Internet of Things home appliances.

For example, as illustrated in FIG. 1A, the electronic device 100 may include a refrigerator. According to an embodiment, the main circuit board 150 and a plurality of audio processors 130 may be arranged in a region (for example, near a refrigerator door) of the refrigerator.

For example, the plurality of audio processors 130 may be spaced apart from each other by a predetermined distance in order to receive a user's voice generated at various locations near the refrigerator. At least one of the audio processors 130 may be electrically connected to the main circuit board 150 through a flexible printed circuit board (FPCB) or a connector. According to another embodiment, at least one of the audio processors 130 may be electrically connected to the main circuit board 150 in a wireless communication scheme.

For another example, as illustrated in FIG. 1B, the electronic device 100 may include storage furniture. The storage furniture may include, for example, the main circuit board 150 and the plurality of audio processors 130 in an inner space of a handle part. The audio processors 130 according to various embodiments may be spaced apart from each other by a predetermined interval in the inner space of the handle part as illustrated in FIG. 1B, but is not limited to the arrangement location and the number of the audio processors 130 in FIG. 1B, and various numbers of audio processors 130 may be arranged in various areas of the electronic device 100 according to a structure of the electronic device 100.

The electronic device 100 according to various embodiments may include a table as illustrated in FIG. 1C. For example, the electronic device 100 may be configured to have a structure in which the main circuit board 150 and the plurality of audio processors 130 are arranged on a lower surface of the table.

According to another embodiment, as illustrated in FIG. 1D, the electronic device 100 may include an appliance (e.g., a lamp) installed on a ceiling. For example, the main circuit board 150 and the plurality of audio processors 130 may be arranged at a lower end portion of the appliance installed on the ceiling.

The electronic device 100 according to various embodiments of the disclosure is not limited to the types of home appliances of FIGS. 1A to 1D, and may be configured in a form in which the main circuit board 150 and the audio processors 130 are mounted on various types of home appliances used in real life. In addition, the number of the audio processors 130 is not limited to two as illustrated in FIGS. 1A to 1D, and various numbers of audio processors 130 (e.g., microphones) may be arranged at various locations of the electronic device 100. Each of the audio processors 130 of the electronic device 100 may be electrically connected to the main circuit board 150 through an FPCB, or may be connected to the main circuit board 150 in a wireless communication scheme.

According to various embodiments, the plurality of audio processors 130 (e.g., microphones) may be spaced apart from each other by a predetermined distance, and may be designed such that each of the audio processors 130 is spaced a substantially identical distance from audio processors 130 adjacent thereto. However, the same spacing distances may be differently designed according to the shape or use of a home appliance, and an algorithm for processing audio information may be differently determined according to the spacing distance and an arrangement direction of a microphone.

FIG. 2 illustrates a block diagram of an electronic device 100 according to various embodiments of the disclosure.

According to various embodiments, the electronic device 100 (e.g., the electronic device 501 of FIG. 5) may include an audio processor 130 and a main circuit board 150.

The electronic device 100 according to various embodiments may include a plurality of audio processors 130. Each of the audio processors 130 may include a configuration of a microphone 235 (e.g., a microphone of the input device 550 of FIG. 5) which obtains audio information by recognizing external sound. The audio processor 130 may optionally include a configuration of a speaker 233 (e.g., a speaker of the sound output device 555 of FIG. 5) which outputs an audio signal to the outside. For example, a speaker 253 may be disposed on the main circuit board 150 instead of being disposed in the audio processor 130.

The audio processor 130, for example, as a separate configuration from the main circuit board 150, may be connected to or disconnected from the electronic device 100 through a connection terminal of the main circuit board 150. For another example, the audio processor 130 may be connected to or disconnected from the main circuit board 150 in a wireless communication scheme.

The main circuit board 150 may include a processor 255 (e.g., the processor 520 of FIG. 5) and a memory 257 (e.g., the memory 530 of FIG. 5) electrically connected by the processor 255.

The processor 255 may control other components (e.g., hardware or software components) of the electronic device 100 connected to the processor 255, and may perform various data processes or operations. According to an embodiment, as at least part of a data process or operation, the processor 255 may load a command (instruction) or data received from another component (e.g., the memory 257 or a communication module 259) into a volatile memory, process the command or data stored in the volatile memory, and store the resulting data in a non-volatile memory.

The processor 255 may recognize the audio processor 130 (e.g., the microphone 235) electrically connected to the main circuit board 150, and obtain connection information relating to the audio processor 130 (e.g., the microphone 235). The processor 255 may identify location information of the audio processor 130 (e.g., the microphone 235) by using the audio processor 130. The processor 255 may obtain algorithm information corresponding to the connection information and the location information through data (e.g., a mapping table) previously stored in the memory 257 or data received from the communication module 259. In addition, the processor 255 may determine the algorithm information as information of an algorithm for processing multiple pieces of audio information to be obtained from the audio processor 130, and store same in the memory 257. For example, the determination and storage of the algorithm may be performed in a manner of a firmware update.

According to various embodiments, the firmware update may include an operation of differently configuring a parameter included in a specific algorithm. For example, according to the connection number or arrangement location information of microphones, a parameter of an algorithm for processing a sound source may be differently configured. For example, the parameter according to various embodiments may include a value related to at least one of the number of microphones, the interval between the microphones, location of the microphones, or direction information of the microphones.

According to various embodiments, if the processor 255 determines that firmware corresponding to identified microphone connection information and microphone location information is not stored in the memory 257, the processor 255 may receive firmware corresponding to the microphone connection information and the microphone location information from an external server through the communication module 259 to perform a firmware update. For example, if the processor 255 determines that audio processors 130 (e.g., the microphone 235), which are more than a preconfigured number, are connected to the main circuit board 150, it may be determined that a new algorithm logic is required, and the processor may request a new algorithm logic from an external server through the communication module 259.

The memory 257 (e.g., the memory 530 of FIG. 5) may store various data used by at least one component (e.g., the processor 255, communication module 259, speakers 233 and 253, or microphone 235) of the electronic device 100. The data may include, for example, input data or output data for software (e.g., a program) and a command related therewith. For example, algorithm information mapped to microphone connection information and location information may be stored in the memory 257. The memory 257 may include a volatile and/or non-volatile memory.

According to various embodiments, the main circuit board 150 may further include at least one of the communication module 259 (e.g., the communication module 590 of FIG. 5) and the speaker 253 (e.g., a speaker of the sound output device 555 of FIG. 5).

The speakers 233 and 253 included in at least one of the main circuit board 150 or the audio processor 130 may output an audio signal to the outside. For example, the audio signal output from the speakers 233 and 253 may be used to determine an audio information processing algorithm for processing audio information obtained through the microphone 235. The speakers 233 and 253 may output an audio signal in a predetermined output intensity and output direction.

The communication module 259 may support establishment of a direct communication channel or a wireless communication channel between the electronic device 100 and an external device, and performing of communication through the established communication channel. The communication module 259 may include at least one communication processor which is operated independently of the processor 255, and supports direct (e.g., wired) communication or wireless communication. According to an embodiment, the communication module 259 may include a wireless communication module (e.g., a cellular communication module, a short-range wireless communication module, or a global navigation satellite system (GNSS) communication module), or a wired communication module (e.g., a local area network (LAN) communication module or a power line communication module). The corresponding communication module among the above communication modules may communicate with an external electronic device through a first network (e.g., a short-range communication network such as Bluetooth, Wi-Fi direct, or an infrared data association (IrDA)) or a second network (e.g., a telecommunication network such as a cellular network, the Internet, or a computer network (e.g., a LAN or WAN)). The various types of communication modules described above may be integrated into one component (e.g., a single chip) or may be implemented by a plurality of components (e.g., a plurality of chips) which are separate from each other. The wireless communication module may identify and authenticate the electronic device 100 in a communication network such as the first network or the second network by using subscriber information stored in a subscriber identification module. For example, the communication module 259 may receive algorithm information for processing audio information from an external device.

Figure 3:
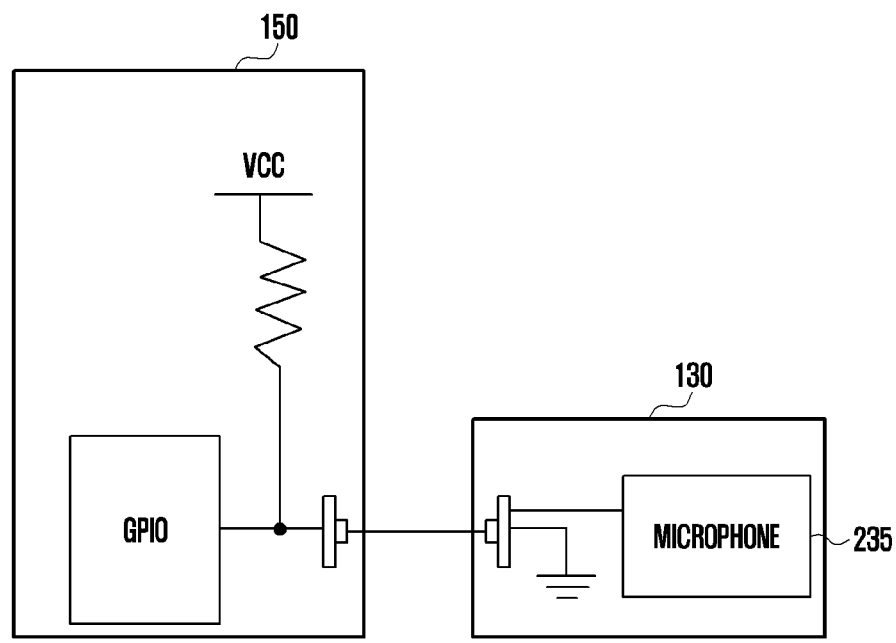
FIG. 3 illustrates a method for recognizing an audio processor (e.g., a microphone) connected to a main circuit board, by an electronic device according to various embodiments of the disclosure.

FIG. 3 illustrates a method for recognizing an audio processor 130 (e.g., a microphone 235) connected to a main circuit board 150, by an electronic device 100 according to various embodiments of the disclosure.

The electronic device 100 according to various embodiments may recognize a connection of the audio processor 130 to the main circuit board 150.

The main circuit board 150 and the audio processor 130 may be connected to each other through various communication schemes (e.g., a bus, a general purpose input and output (GPIO), a serial peripheral interface (SPI), or a mobile industry processor interface (MIPI)), and exchange a signal (such as command or data).

A processor 255 of the electronic device 100 according to various embodiments may obtain connection information of the audio processor 130 connected to the electronic device 100. For example, the connection information may include at least one of information on the number of audio processors 130 (e.g., microphones 235) electrically connected to the main circuit board 150 and directional information of the microphones 235 of the connected audio processors 130.

Referring to FIG. 3, according to an embodiment, if the audio processor 130 (e.g., the microphone 235) is connected to the main circuit board 150 through a GPIO, the electronic device 100 may recognize that an interrupt has occurred due to a resistance size which is changed by the connection of the audio processor 130. For example, the processor 255 of the main circuit board 150 may recognize the interrupt to identify the connection of the audio processor 130. The electronic device 100 may recognize whether at least one audio processor 130 is connected, by using the above manner. For example, the processor 255 may identify the number of the audio processors 130 (e.g., the microphones 235) recognized as being connected to the main circuit board 150.

According to an embodiment, the processor 255 may recognize a direction pin ID of a connection terminal to which the audio processor 130 is connected, and identify directional information of sound received by the microphone 235 of the connected audio processor 130. According to another embodiment, when the microphone 235 of the audio processor 130 includes a directional microphone, the processor 255 may identify directional information of sound by using audio information obtained through the microphone 235.

According to various embodiments, the main circuit board 150 and the audio processor 130 may be electrically connected to each other through an FPCB. For example, the FPCB may include a connector for supporting the connection of the main circuit board 150 and the audio processor 130.

According to another embodiment, in the electronic device 100 according to various embodiments, the main circuit board 150 may be connected to at least one audio processor 130 in a wireless communication scheme. For example, the processor 255 may identify the connection of the at least one audio processor 130 connected through wireless communication. For example, the processor 255 may obtain connection information for the audio processor 130 by receiving information including a media access control (MAC) address from a specific audio processor 130. For example, the at least one audio processor 130 connected to the main circuit board 150 in a wireless communication scheme may transmit the obtained audio information to the main circuit board 150.

Figure 4:
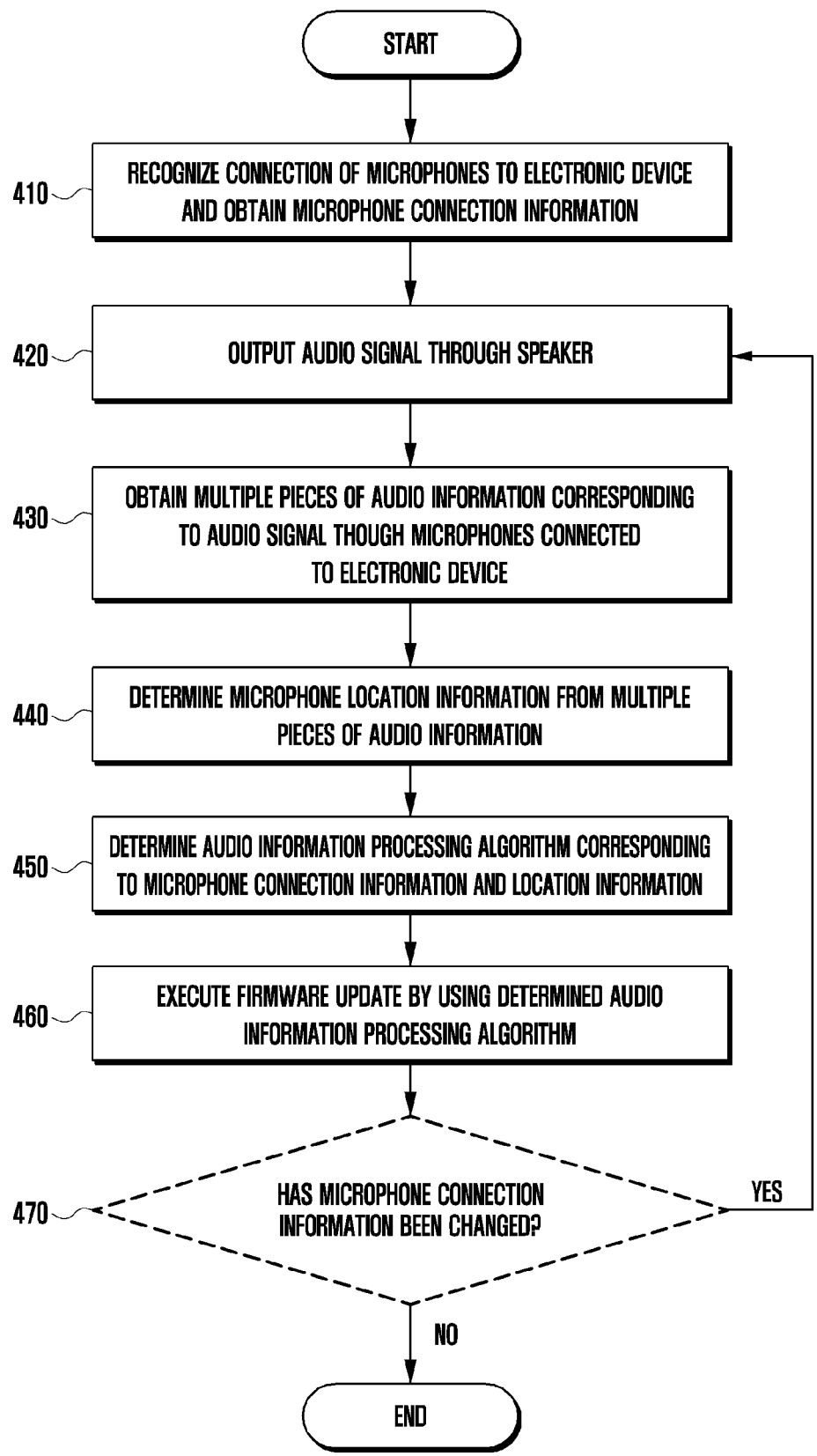
FIG. 4 illustrates a flowchart relating to a method for designating an algorithm for processing audio information by an electronic device according to various embodiments of the disclosure.

FIG. 4 illustrates a flowchart relating to a method for determining an audio information processing algorithm for processing audio information by an electronic device 100 according to various embodiments of the disclosure.

Referring to FIG. 4, the electronic device 100 according to various embodiments may automatically configure an algorithm for processing multiple pieces of audio information obtained through a plurality of microphones connected to the electronic device 100. For example, the algorithm for processing the multiple pieces of audio information may include a preprocessing operation for minimizing noise relating to the multiple pieces of audio information obtained from the microphones.

According to various embodiments, in operation 410, the electronic device 100 may recognize a connection of an audio processor 130 to the electronic device 100 (e.g., a main circuit board 150). For example, the audio processor 130 may include a microphone 235. The electronic device 100 may recognize whether at least one microphone 235 is connected to the electronic device 100, through a processor 255, and obtain microphone connection information including the number of the microphones 235 which are recognized as being connected.

According to an embodiment, the microphone connection information may include directional information relating to audio information obtained from the microphones 235. For example, the processor 255 may obtain directional information of the microphones 235 by identifying a direction pin ID of a connection terminal to which each of the at least one microphone 235 is connected.

For another example, the electronic device 100 may obtain connected microphone connection information from the outside through a communication module 259 or may obtain connection information of the microphones through an input module (not shown).

In operation 420, the electronic device 100 according to various embodiments may control an audio signal to be output to the outside. For example, the electronic device 100 may output an audio signal to the outside through speakers 233 and 253. According to an embodiment, the speaker 233 may be included in at least one audio processor 130 which is connected to the electronic device 100 and recognized. According to another embodiment, the speaker 253 may be pre-mounted on the main circuit board 150 of the electronic device 100 separately from the audio processor 130. For example, at least one of the speakers 233 and 253 may output an audio signal to the outside in order to obtain multiple pieces of audio information for determining an algorithm for processing audio information.

In operation 430, the processor 255 of the electronic device 100 may obtain multiple pieces of audio information corresponding to an audio signal output through at least one speaker 233 and 253, by using the microphones 235 of the audio processors 130 connected to the electronic device 100.

According to various embodiments, a plurality of microphones 235 may be connected to the electronic device 100, and multiple pieces of audio information may be obtained at the same time by using the microphones 235, respectively. For example, with respect to an audio signal output by a speaker 233 or 253, the plurality of microphones 235 connected to the electronic device 100 may obtain audio information. Since the plurality of microphones 235 may be different from each other in arrangement locations and directions of the microphones 235, even when the plurality of microphones 235 obtain multiple pieces of audio information for one audio signal, the multiple pieces of audio information obtained based on a location and a direction of each of the microphones 235 may be different from each other.

In operation 440, the processor 255 may identify microphone location information relating to the microphones 235, based on the multiple pieces of audio information obtained through the microphones 235.

The microphone location information may include information on a spacing distance between the microphones 235. According to an embodiment, when the microphones 235 include a directional microphone, the microphone location information identified by the processor 255 may further include direction information of the microphones 235.

According to various embodiments, the processor 255 may identify location information of the microphones 235, based on information (for example, an output strength of an audio signal and an arrangement location of the speaker) of the speaker having output the audio signal. For example, the processor 255 may identify microphone location information, at least based on an audio signal output through the speakers 233 and 253 and audio information obtained through each of the microphones 235.

According to various embodiments, the plurality of microphones 235 connected to the electronic device 100 may be arranged such that each of the microphones 235 is spaced a substantially identical distance from microphones 235 adjacent thereto. The processor 255 may identify spacing distance information between the microphones 235, based on the strength of the audio signal output from the speaker and the arrangement location of the speaker, and the strength of the audio information obtained through each of the microphones 235.

According to various embodiments, the electronic device 100 may identify location information of the microphones through the plurality of speakers 233 and 253. For example, the electronic device 100 may output a first audio signal through the speaker 233, and obtain audio information corresponding to the first audio signal to identify location information of the microphones. The electronic device 100 may output a second audio signal through the speaker 253 disposed at a location different from the speaker 233, and obtain audio information corresponding to the second audio signal to identify location information of the microphones. According to various embodiments, the electronic device 100 may identify location information of the microphones by using the plurality of speakers several times, and finally determine location information of the microphones, based on the identification information.

In operation 450, the processor 255 may determine algorithm information for processing audio information, based on microphone connection information and microphone location information.

For example, the processor 255 may determine the algorithm information, based on at least one of information on the number of the microphones 235 connected to the electronic device 100, distance information between the connected microphones 235, or arrangement direction information of the microphones 235.

According to an embodiment, the processor 255 may obtain the algorithm information from information stored in a memory 257. According to another embodiment, the processor 255 may receive the algorithm information from the outside through a communication module 259.

For example, the processor 255 may select algorithm information corresponding to microphone connection information and microphone location information from a mapping table pre-stored in the memory 257.

When the algorithm information corresponding to the identified microphone connection information and microphone location information is not stored in the memory 257, the processor 255 may receive algorithm information corresponding to the microphone connection information and the location information from the outside through the communication module 259. For example, the communication module 259 may include a wired communication module or a wireless communication module. For example, the communication module 259 may be implemented by at least one wireless communication scheme of Bluetooth, Wi-Fi, LTE, 4 G, 5 G, Zigbee, or Z-wave.

According to various embodiments, in operation 460, the processor 255 may determine the algorithm information as information of an algorithm for processing multiple pieces of audio information.

The electronic device 100 may perform predetermined processing on multiple pieces of audio information obtained through the plurality of microphones 235 connected to the electronic device 100. For example, the processing on the multiple pieces of audio information may include a preprocessing operation (e.g., noise cancelling) for minimizing noise relating to the multiple pieces of audio information. For example, the noise may refer to noise other than voice information of a user.

For example, at least some pieces of the audio information obtained from the plurality of microphones 235 may include relatively more noise than other audio information. For example, the algorithm information for processing audio information may include a command for comparing the multiple pieces of audio information to separate voice information and noise information, and extracting the voice information from the audio information.

The algorithm for processing audio information may be configured differently based on information of the plurality of microphones 235 which provide audio information. For example, an algorithm for processing audio information may be required to be configured differently, according to the number of connected microphones 235 and locations (arrangement distance and arrangement direction) where the microphones 235 are arranged.

The electronic device 100 according to various embodiments may automatically identify information (e.g., microphone connection information and microphone location information) on the microphones 235 by using the audio processor 130 connected to the electronic device 100, and may designate algorithm information selected based on the information on the microphones as information of an algorithm for processing multiple pieces of audio information to be obtained later. The determination of the algorithm for processing the information may be performed in a manner of a firmware upgrade for the processor. According to various embodiments of the disclosure, the configuration of the audio processor 130 of the electronic device 100 may be used to automatically determine an algorithm for processing audio information, without individually configuring an algorithm for processing audio information according to the number and/or locations of the microphones 235 connected to the electronic device 100.

In operation 470, when the electronic device 100 according to various embodiments recognizes that connection information of the microphones is changed, the electronic device 100 may configure an audio information processing algorithm corresponding to the changed microphone connection information by performing operations 420 to 460 again. For example, the electronic device 100 may recognize additional connection of at least one microphone 235 or disconnection of the connected microphone 235. The electronic device 100 may re-designate an algorithm for processing audio information by reflecting the changed microphone connection information.

Although not shown, the electronic device 100 according to various embodiments may output a user notification through a display device (e.g., a display device 560 of FIG. 5) and a sound output device (e.g., the sound output device 555 of FIG. 5), based on the microphone location information identified in operation 440. For example, if the electronic device 100 determines that the identified microphone location information does not correspond to a preconfigured condition, the electronic device 100 may output a user notification in order to provide, to a user, a guide for adjusting at least one of locations of the microphones to a location which meets the preconfigured condition.

For example, when a first microphone, a second microphone, and a third microphone are connected to the electronic device 100, the electronic device 100 may output a notification which suggests to move the third microphone to at least one location where an interval between the third microphone and the first microphone and an interval between the third microphone and the second microphone correspond to an interval between the first microphone and the second microphone.

For example, the electronic device 100 may output a user notification which suggests to adjust a location of at least one microphone, through at least one of the microphones connected to the electronic device 100. For another example, the electronic device 100 may output an image including suggested location information of the microphone, through the display device (e.g., the display device 560 (e.g., a display) of FIG. 5) connected to the electronic device 100.

FIG. 5 illustrates a block diagram of an electronic device 501 in a network environment 500 according to various embodiments. Referring to FIG. 5, the electronic device 501 in the network environment 500 may communicate with an electronic device 502 via a first network 598 (e.g., a short-range wireless communication network), or an electronic device 504 or a server 508 via a second network 599 (e.g., a long-range wireless communication network). According to an embodiment, the electronic device 501 may communicate with the electronic device 504 via the server 508. According to an embodiment, the electronic device 501 may include a processor 520, memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In some embodiments, at least one (e.g., the display device 560 or the camera module 580) of the components may be omitted from the electronic device 501, or one or more other components may be added in the electronic device 501. In some embodiments, some of the components may be implemented as single integrated circuitry. For example, the sensor module 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520, and may perform various data processing or computation. According to one embodiment, as at least part of the data processing or computation, the processor 520 may load a command or data received from another component (e.g., the sensor module 576 or the communication module 590) in volatile memory 532, process the command or the data stored in the volatile memory 532, and store resulting data in non-volatile memory 534. According to an embodiment, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to an embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to an embodiment, the audio module 570 may obtain the sound via the input device 550, or output the sound via the sound output device 555 or a headphone of an external electronic device (e.g., an electronic device 502) directly (e.g., wiredly) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. According to an embodiment, the sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., wiredly) or wirelessly. According to an embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector), The haptic module 579 may convert an electrical signal into a mechanical stimulus (e.g., a vibration or a movement) or electrical stimulus which may be recognized by a user via his tactile sensation or kinesthetic sensation. According to an embodiment, the haptic module 579 may include, for example, a motor, a piezoelectric element, or an electric stimulator.

The camera module 580 may capture a still image or moving images. According to an embodiment, the camera module 580 may include one or more lenses, image sensors, image signal processors, or flashes.

The power management module 588 may manage power supplied to the electronic device 501. According to one embodiment, the power management module 588 may be implemented as at least part of, for example, a power management integrated circuit (PMIC).

The battery 589 may supply power to at least one component of the electronic device 501. According to an embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the application processor (AP)) and supports a direct (e.g., wired) communication or a wireless communication. According to an embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or infrared data association (IrDA)) or the second network 599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to an embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 540) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Various embodiments according to the disclosure can provide a function of, even without user's or designer's manual configuration to apply an algorithm for processing audio information corresponding to an arrangement design of microphones connected to an electronic device whenever the arrangement design of the microphones is changed, identifying information of the microphones and automatically updating firmware to apply an audio information processing algorithm corresponding to the microphone information in the electronic device. Accordingly, even when an electronic device in a new design is released according to a product type or use of the electronic device, or the number of microphones connected to the electronic device is changed after the release, an appropriate algorithm for processing audio information can be automatically applied to the electronic device.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a plurality of microphones;
a memory configured to store a plurality of instructions; and
a processor operatively connected to the plurality of microphones and the memory,
wherein the plurality of instructions, when executed by the processor, cause the electronic device to:
recognize connection of the plurality of microphones to the electronic device;
obtain connection information for the plurality of microphones;
generate a signal for outputting an audio signal;
obtain multiple pieces of audio information corresponding to the output audio signal, through the plurality of microphones;
identify location information for the plurality of microphones, at least based on the multiple pieces of audio information;
determine an audio information processing algorithm corresponding to the connection information and the location information, based on one or more pieces of audio information processing algorithm information stored in the memory; and
execute a firmware update for the processor such that the multiple pieces of audio information obtained through the plurality of microphones is processed using the determined audio information processing algorithm.

2. The electronic device of claim 1, wherein the connection information and the location information comprise at least one of: information on a number of the plurality of microphones connected to the electronic device; information on a distance between the plurality of microphones; or direction information of at least one of the plurality of microphones.

3. The electronic device of claim 1, further comprising one or more speakers,
wherein at least some of the one or more speakers are arranged in a location corresponding to at least one of the plurality of microphones or in a location corresponding to the processor.

4. The electronic device of claim 3, wherein the processor is configured to identify the location information for the plurality of microphones, based on arrangement locations of the one or more speakers.

5. The electronic device of claim 1, wherein the plurality of microphones are arranged such that each of the plurality of microphones is spaced a substantially identical distance from microphones adjacent thereto.

6. The electronic device of claim 1, further comprising a communication module,
wherein the processor is configured to receive algorithm information corresponding to the connection information and the location information, through the communication module, and execute the firmware update such that the multiple pieces of audio information obtained through the microphones is processed by using the received algorithm information corresponding to the connection information and the location information.

7. The electronic device of claim 6, wherein the communication module comprises at least one of a wired communication module or a wireless communication module.

8. The electronic device of claim 1, wherein the processor is configured to, if the connection information for the microphones is changed, re-execute operations of:
obtaining the connection information,
outputting the audio signal,
obtaining the multiple pieces of audio information corresponding to the audio signal,
identifying the location information of the microphones,
selecting the audio information processing algorithm information, and
executing the firmware update.

9. The electronic device of claim 1, wherein at least one of the plurality of microphones comprises a directional microphone.

10. The electronic device of claim 1, wherein the processor is configured to, at least based on the audio information processing algorithm for processing the multiple pieces of audio information:
separate voice information and noise information from the multiple pieces of audio information, based on connection information and location information of at least one of the microphones, and
extract the voice information from the multiple pieces of audio information.

11. An audio information processing method of an electronic device, the method comprising:
recognizing, by a processor of the electronic device, connection of a plurality of microphones to the electronic device;
obtaining, by the processor, connection information for the microphones;
generating, by the processor, a signal for outputting an audio signal;
obtaining multiple pieces of audio information corresponding to the output audio signal, through the plurality of microphones;
identifying, by the processor, location information for the plurality of microphones, at least based on the multiple pieces of audio information;
determining, by the processor, an audio information processing algorithm corresponding to the connection information and the location information, based on one or more pieces of audio information processing algorithm information stored in a memory of the electronic device; and
executing, by the processor, a firmware update for the processor so as to allow the multiple pieces of audio information obtained through the plurality of microphones to be processed by using the determined audio information processing algorithm.

12. The method of claim 11, wherein the connection information and the location information comprise at least one of: information on a number of the plurality of microphones connected to the electronic device; information on a distance between the plurality of microphones; or direction information of at least one of the plurality of microphones.

13. The method of claim 11, wherein the electronic device further comprises one or more speakers, and
wherein at least some of the one or more speakers are arranged in a location corresponding to at least one of the plurality of microphones or in a location corresponding to the processor.

14. The method of claim 13, wherein the identifying of the location information for the microphones comprises identifying, by the processor, the location information for the microphones, based on arrangement locations of the one or more speakers.

15. The method of claim 11, wherein the plurality of microphones are arranged such that each of the microphones is spaced a substantially identical distance from microphones adjacent thereto.

16. The method of claim 11, further comprising:
receiving algorithm information corresponding to the connection information and the location information, through a communication module of the electronic device; and
executing, by the processor, the firmware update so as to allow the multiple pieces of audio information obtained through the microphones to be processed by using the received algorithm information corresponding to the connection information and the location information.

17. The method of claim 16, wherein the communication module comprises at least one of a wired communication module or a wireless communication module.

18. The method of claim 11, further comprising:
recognizing a change in the connection information for the microphones; and
re-executing, based on the change in the connection information, operations of:
obtaining the connection information,
outputting the audio signal,
obtaining the multiple pieces of audio information corresponding to the audio signal,
identifying the location information of the microphones,
selecting the audio information processing algorithm information, and
executing the firmware update.

19. The method of claim 11, wherein at least one of the plurality of microphones comprises a directional microphone.

20. The method of claim 11, further comprising, at least based on the audio information processing algorithm for processing the multiple pieces of audio information:
separating voice information and noise information from the multiple pieces of audio information obtained through the plurality of microphones, based on connection information and location information of at least one of the microphones, and
extracting the voice information from the multiple pieces of audio information.

* * * * *